(No Model.) 2 Sheets—Sheet 2.
P. WITTECK.
AUTOMATIC WEIGHING SCALE FOR LIQUIDS.
No. 382,849. Patented May 15, 1888.
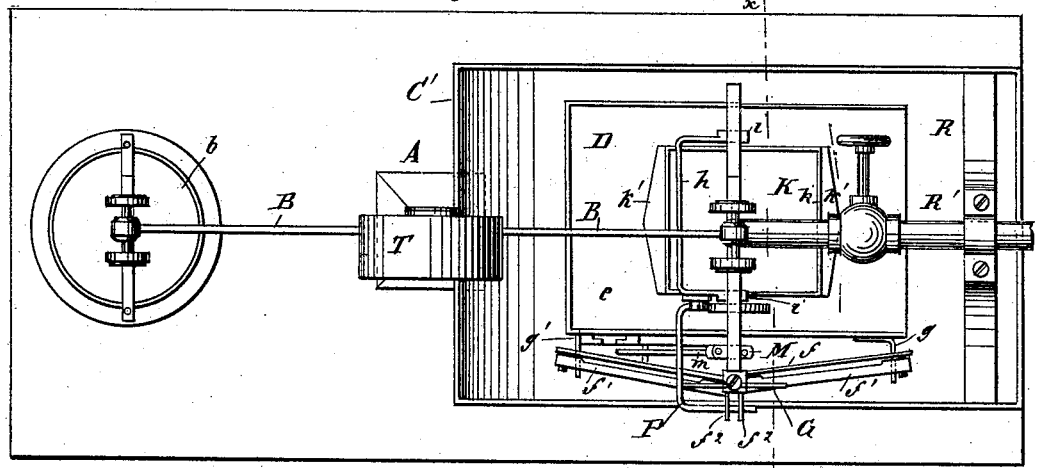
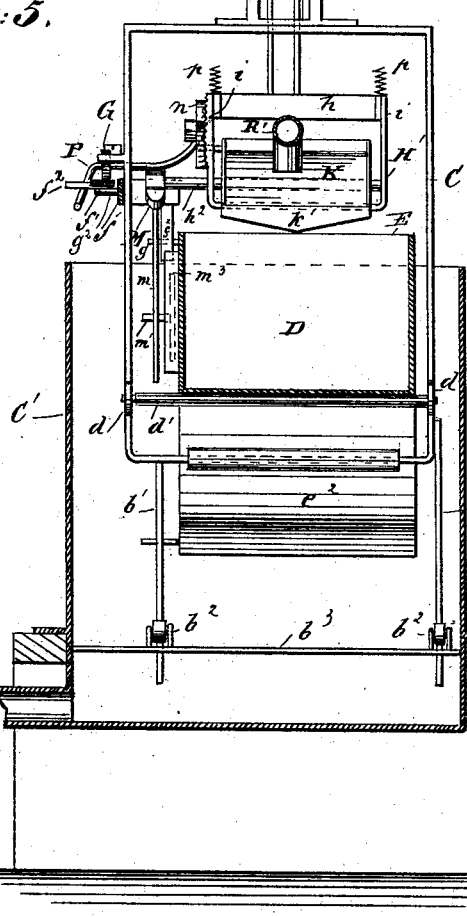
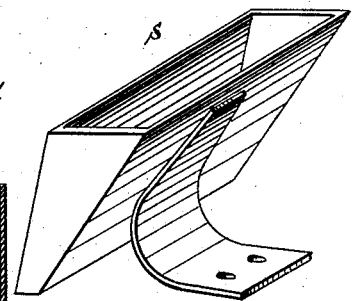
WITNESSES:
Chas. Nida
C. Sedgwick
INVENTOR:
P. Witteck
BY Munn & Co
ATTORNEYS.

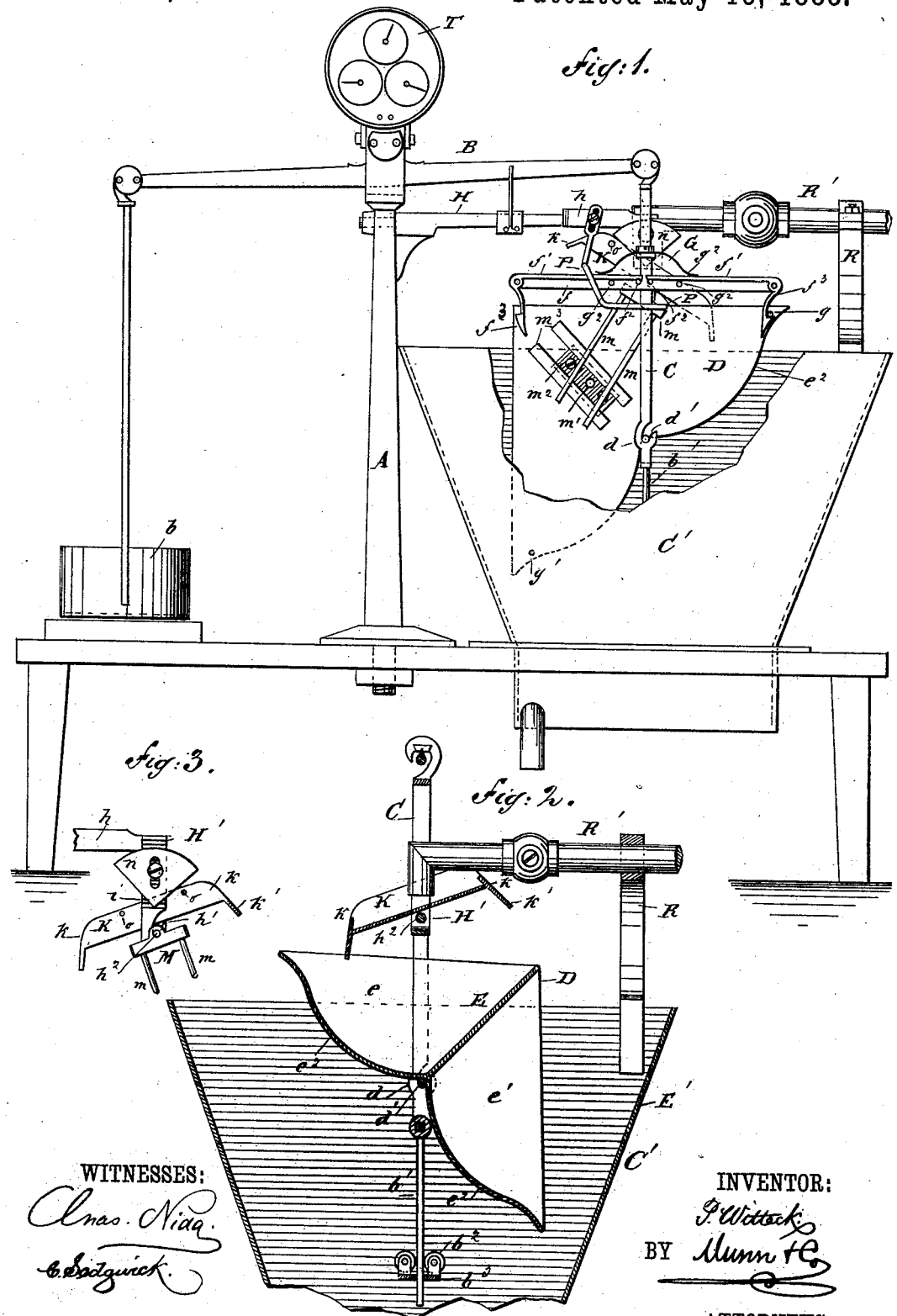

UNITED STATES PATENT OFFICE.

PAUL WITTECK, OF BUTLER, NEW JERSEY.

AUTOMATIC WEIGHING-SCALE FOR LIQUIDS.

SPECIFICATION forming part of Letters Patent No. 382,849, dated May 15, 1888.

Application filed October 28, 1887. Serial No. 253,609. (No model.)

*To all whom it may concern:*

Be it known that I, PAUL WITTECK, of Butler, in the county of Morris and State of New Jersey, have invented a new and Improved Scale, of which the following is a full, clear, and exact description.

My invention relates to an improvement in scales, and has for its object to provide a scale for weighing liquids or solids having a reversible measure, means for automatically supplying the matter to be weighed to the measure, and means for automatically emptying the measure when filled.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in all the figures.

Figure 1 is a side elevation, partially sectional, of the scale. Fig. 2 is a partial longitudinal sectional view. Fig. 3 is a detail view of the delivery-table and actuating mechanism. Fig. 4 is a plan view of the scale. Fig. 5 is a transverse vertical section on the line $x\ x$ in Fig. 4, and Fig. 6 is a perspective view of the hopper employed when dry material is to be weighed.

In carrying out the invention, A represents the upright standard of an ordinary T-balance, and B the horizontal balance-beam pivoted in said standard in the usual manner.

From one end of the beam B a weight-cup, $b$, is suspended, and from the opposite end a substantially rectangular frame, C, which frame is projected downward in a hopper, C', and provided at each lower corner with perpendicular guide-arms $b'$, adapted to slide between friction-pulleys $b^2$, supported upon a brace, $b^3$, extending horizontally from side to side of the hopper, as illustrated in Figs. 2 and 5.

Near the base of each side piece of the balance-frame C hook-shaped bearings $d$ are formed, in which the trunnions $d'$ of a double scoop or measure, D, are journaled. The scoop D is made triangular in shape and divided into two compartments, $e$ and $e'$, by a transverse partition, E, extending from the center of the closed or bottom side outward flush with the upper central corners, as illustrated in Fig. 2.

The bottom $e^2$ of each compartment is curved or made exteriorly convex, the said curve in each case commencing with the upper outer corner and terminating centrally the complete scoop or at the intersection of the partition E with the base. In the line of the partition at the center of the base the trunnions are attached, which consist of a bar secured transversely the base and projecting a distance beyond the sides of the scoop.

Above the hopper C' a bar, $f$, is attached transversely to the front side piece of the rectangular frame C, and at the ends of said bar independent trip-arms $f'$ are pivoted at their angles, which arms are projected toward each other, their inner contiguous ends extending to the center of the transverse bar $f$, which ends are provided with outwardly-extending pins $f^2$ at right angles to the tripping-arms.

The outer ends of the arms $f'$ are bent downward and inward, terminating in hook-like ends $f^3$, adapted to engage pins $g\ g'$, attached to the upper ends or front corners of the scoop D, as illustrated in Figs. 1 and 4. The trip-arms $f'$ are held in a normal horizontal position against pins $g^2$, secured in the bar $f$ by a bow-spring, G, attached to a stud projecting from the frame C, which spring has a bearing at its ends upon the respective arms $f'$.

From the standard A a beam, H, is projected rigidly attached thereto, which beam is parallel with one section of the balance-beam, terminating in a bifurcated end, $h$, extending within the rectangular frame C. A U-shaped bar, H', is secured by its members to the bifurcated end of the beam H, which bar is at right angles to said beam, projecting downward beneath the same.

The vertical members $i$ of the bar H', near their intersection with the horizontal body, are provided with aligning inclined slots $h'$, in which a shaft, $h^2$, is journaled, adapted to carry a table, K. The table K is secured centrally upon the shaft $h^2$, and is constructed of a rectangular shape with flanged sides and ends, the ends $k$ being inclined inward and provided with an integral downwardly and outwardly extending lip, $k'$, inclined in the same plane with the flanged ends, which lips are beveled upward upon their lower edges in opposite directions from the center.

From the forward outer end of the shaft $h^2$ the fingers $m$ of an attached yoke, M, are projected downward to a bearing upon the front side of the scoop D and astraddle of a pin, $m'$, integral with a serrated plate, $m^2$, adapted to slide in ways $m^3$, secured centrally the said outer face of the scoop, the inner face of which ways are serrated to engage the serrated face of the sliding plate $m^2$, which plate is held in a predetermined position by set-screws. The object of the pin and adjustable plate is to regulate the throw of the table K, as by means of the yoke M the table is automatically made to turn simultaneously with the scoop and deliver the material to be weighed to the uppermost compartment of the scoop. As an equivalent adjustment for the table, the outer face of the front vertical member, $i$, of the bar H' is serrated, as shown in Fig. 3, and a quadrant-block, $n$, adjustably secured to said member by a set-screw, is serrated upon the inner face, where it engages the serrated surface of the latter, whereby when the block is fixed upon the member $i$ it will be effectually prevented from slipping. The tilting of the table K is regulated by studs $o$, projecting from the front face at each side of the block engaging the latter. The higher up the block is adjusted the greater the inclination given to the table, and vice versa.

Upon the upper ends of the members $i$ of the bar H' spring-cushions $p$ are secured, adapted to receive the balance-frame C when carried down by the weight in the scoop.

From the forward bifurcated ends, $h$, of the fixed beam H a rod, P, is projected downward and outward over the tripping-arms $f'$, the end of which rod is carried at right angles beneath the pins $f^2$, integral with said arms, as shown in Fig. 4.

By means of a bracket, R, a section of pipe, R', is supported above the hopper, having its outlet above and over the center of the table K, which pipe is provided with a suitable stop-cock, the purpose of the pipe being to supply the liquid to the delivery-table, to be by said table delivered to the compartments of the scoop. A suitable pipe is also provided to conduct the measured liquid from the hopper. When dry material—such as seed or grain—is to be weighed, a hopper, S, similar to that illustrated in Fig. 6, may be used, an auxiliary hopper being also attached to the main or receiving hopper C'.

At the upper end of the standard A a registering device, T, may be placed to be operated by the movement of the balance-beam, wherein each complete downward movement of the beam carrying the measuring-scoop will cause the amount dumped by the said scoop to appear upon the dial of the register.

In operation the fluid passes through the pipe R' into the tilting table K, and from thence over the inclined lip $k'$ in a central stream into the uppermost compartment of the scoop. When an amount of liquid predetermined by the weight in the cup $b$ has been received in the said uppermost compartment of the scoop, the scoop will have been carried down, likewise the frame C, into the hopper D, causing the pin $f^2$ to bear upon the rod P, which releases the pin of the scoop from the catches $f^3$, whereupon the uppermost compartment of the scoop will turn downward and empty its contents in the hopper, the dial indicating at the same time the amount. As the liquid from one compartment is emptied the other compartment of the scoop comes uppermost, and by means of the pin $m'$ engaging an arm, $m$, of yoke M, the table is automatically and simultaneously tilted to deliver the liquid to the other and now uppermost compartment, the flanged sides and ends of the table preventing the liquid from spilling before time for delivery. When this compartment receives the requisite weight, the operation of tripping and emptying above described is repeated, and the compartment previously emptied comes up to receive its supply, the table tilting over in that direction. Thus the weighing may go on continuously until the supply is exhausted or cut off.

Having thus described my invention, what I claim as new, and desire to secure by Letters Patent, is—

1. The combination, with a scale-beam and the frame suspended therefrom, of the divided scoop pivoted therein, a transverse bar secured to the frame, angular catches pivoted at their angles to the ends of the said bar and engaging the opposite ends of the scoop alternately with their vertical arms, pins on the horizontal or trip arms of the catches, and a releasing device in the path of the said pins when the frame and scoop are depressed, substantially as set forth.

2. The combination, with the scale-beam, the frame suspended therefrom, and the scoop pivoted in said frame and having a partition, of the tilting table pivoted above the scoop and provided with flanges at its sides and at its ends, the end flanges being inclined inward and having downward and outward extending lips, and connections between the table and scoop, substantially as set forth.

3. The combination, with the scale-beam, the frame suspended therefrom, and the scoop pivoted to the frame, of the tilting table above the scoop, connections between said table and scoop, and an adjustable stop limiting the throw of the table, substantially as set forth.

4. The combination, with the scale-beam, the frame suspended therefrom, and the scoop pivoted in the frame, of a tilting table above the scoop, a yoke connected with the table, and an adjustable stop on the scoop and with which said yoke engages, substantially as set forth.

5. The combination, with a scale-beam, a frame suspended from one end and a weight from the other, a scoop divided into compartments by a central partition and provided with a central adjustable projection upon one outer face, and a receiving-receptacle beneath said scoop, of a flanged tilting table pivoted above the uppermost compartment of the scoop, a yoke secured to the axis of said table, the arms whereof extend downward at each side of the said adjustable projection, and a supply-pipe having an outlet centrally above the table, substantially as and for the purposes herein set forth.

6. The combination, with a scale-beam, a frame suspended from one end and a weight from the other, a scoop divided into two compartments by a central partition and provided with a central adjustable projection, a cross-bar attached to the front of said frame, retaining-arms pivoted at the ends of said bar, provided with catches at their outer extremities adapted to engage pins secured upon the scoop, and a receiving-receptacle below said scoop, of a flanged tilting table pivoted above the uppermost compartment of the scoop, a yoke secured to the axis of the table, the arms whereof engage the said adjustable projection, a curved tripping-bar secured to the table-support projecting under the inner ends of the retaining-arms, and a supply-pipe having an outlet centrally above the table, substantially as and for the purposes herein set forth.

7. The combination, with a scale-beam, a frame suspended from one end and a weight from the other, a scoop divided into two compartments by a central partition and having a curved bottom, and provided with a central adjustable projection, a cross-bar attached to the front of said frame, retaining-arms pivoted at the ends of said bar, provided with catches at their outer extremities adapted to engage pins secured upon the scoop, and a receiving-receptacle below said scoop, of a flanged tilting table pivoted above the uppermost compartment of the scoop having beveled end lips, a yoke secured to the axis of said table, the arms whereof engage said sliding projection, a tripping-bar secured to the table-support projecting under the inner ends of the retaining-arms, and means, substantially as described, for supplying material to the table, as and for the purposes set forth.

PAUL WITTECK.

Witnesses:
JAS. F. McLEAN,
EDWARD E. BALL.